(12) United States Patent
Moenkemoeller

(10) Patent No.: US 10,634,603 B2
(45) Date of Patent: Apr. 28, 2020

(54) PARTICLE-MEASURING APPARATUS AND METHOD OF OPERATING SAME

(71) Applicant: paragon ag, Delbrueck (DE)

(72) Inventor: Ralf Moenkemoeller, Bielefeld (DE)

(73) Assignee: paragon GmbH & Co. KGaA, Delbrueck (DE)

( * ) Notice: Subject to any disclaimer, the term of this patent is extended or adjusted under 35 U.S.C. 154(b) by 126 days.

(21) Appl. No.: 15/888,577

(22) Filed: Feb. 5, 2018

(65) Prior Publication Data

US 2018/0231454 A1    Aug. 16, 2018

(30) Foreign Application Priority Data

Feb. 15, 2017  (DE) .................. 10 2017 001 436

(51) Int. Cl.

| | | |
|---|---|---|
| *G01N 21/00* | (2006.01) | |
| *G01N 15/14* | (2006.01) | |
| *G01N 15/06* | (2006.01) | |
| *G01N 1/22* | (2006.01) | |
| *G01N 15/02* | (2006.01) | |
| *G01N 21/53* | (2006.01) | |
| *G01N 15/00* | (2006.01) | |

(52) U.S. Cl.
CPC .......... *G01N 15/1434* (2013.01); *G01N 1/22* (2013.01); *G01N 15/0205* (2013.01); *G01N 15/06* (2013.01); *G01N 15/1459* (2013.01); *G01N 21/53* (2013.01); *G01N 2001/2223* (2013.01); *G01N 2015/0046* (2013.01); *G01N 2015/0693* (2013.01); *G01N 2015/1486* (2013.01)

(58) Field of Classification Search
CPC .............. G01N 15/0205; G01N 15/06; G01N 15/1434; G01N 15/1459; G01N 1/22; G01N 2001/2223; G01N 2015/0046; G01N 2015/0693; G01N 2015/1486; G01N 21/53
USPC .................................................. 356/337–344
See application file for complete search history.

(56) References Cited

U.S. PATENT DOCUMENTS

| | | | |
|---|---|---|---|
| 8,470,246 B2 * | 6/2013 | Rich ................... | G01N 15/1404 137/15.01 |
| 2012/0131989 A1* | 5/2012 | Vanhanen .............. | G01N 15/06 73/28.01 |
| 2014/0225005 A1* | 8/2014 | Yamasaki .......... | G01N 15/1459 250/459.1 |
| 2015/0211977 A1* | 7/2015 | Sekimoto ............... | G01N 15/10 356/338 |

(Continued)

*Primary Examiner* — Sunghee Y Gray
(74) *Attorney, Agent, or Firm* — Andrew Wilford

(57) ABSTRACT

A particle-measuring apparatus (1) has an optical particle sensor (2, 3, 5, 6). By means of the optical particle sensor (2, 3, 5, 6) a particle mass concentration in an aerosol volume can be detected. Furthermore, the particle-measuring apparatus (1) has a measurement chamber (7), in which the aerosol volume to be examined with regard to the particle mass concentration by means of the optical particle sensor (2, 3, 5, 6) can be received, and a conveying device (11), by means of which the aerosol can be introduced into the measurement chamber (7).

In order to prevent the particle-measuring apparatus (1) from being adversely affected during operation as a result of dirt or particle deposits, it is proposed that the delivery rate of the conveying device (11) of the particle-measuring apparatus (1) is adjustable.

9 Claims, 2 Drawing Sheets

(56) References Cited

U.S. PATENT DOCUMENTS

2015/0346077 A1\* 12/2015 Sekimoto .......... G01N 15/1436
250/461.1

\* cited by examiner

PARTICLE-MEASURING APPARATUS AND METHOD OF OPERATING SAME

The invention relates to a particle-measuring apparatus comprising an optical particle sensor, by means of which a particle mass concentration in an aerosol volume can be detected, a measurement chamber, in which the aerosol volume to be examined with regard to the particle mass concentration by means of the optical particle sensor can be received, and a conveying device, by means of which the aerosol can be introduced into the measurement chamber, and to a corresponding method for operating a particle-measuring apparatus.

An aerosol is understood to mean particles in liquid or solid phase suspended in air or a carrier gas in the airborne state. The aerosol is considered to be a disperse system formed of solid or liquid particles that are finely distributed in air or a carrier gas.

Aerosols are characterized by single basic features. A single individual aerosol particle is described by three features, specifically shape, size and substance. The aerosol as an accumulation of many individual particles or as a particle collective is described in greater detail by further properties, specifically concentration and particle size distribution.

Optical particle sensors often work with electromagnetic radiations in a wavelength range of from 600 nm to 780 nm.

The wavelength range of 380 nm to 780 nm is also referred to as light, since it lies within the range perceived by the human eye.

Hereinafter, the term "light" will therefore also be used instead of the term "electromagnetic radiation", since the term "light" includes the range of electromagnetic wavelengths usual for optical particle sensors.

A wavelength of approximately 655 nm is often used, since there are very economical laser diodes with this wavelength as a source for the required light.

In order to measure the particle mass concentration, aerosol photometers (APMs) are used, which are also referred to in the technical literature as "light-scattering nephelometers".

Aerosol photometers measure the concentration in a particle collective. The measurement result is the particle mass concentration. This is often specified in mg/m$^3$.

Due to their operating principle, aerosol photometers can be used with particle mass concentrations up to several 100 mg/m$^3$.

Either laser diodes or light-emitting diodes (LEDs) are used as monochromatic light source for aerosol photometers. LEDs are used in economical aerosol photometers. In principle, optical smoke detectors for example fall under the group of aerosol photometers.

In the case of aerosol photometers a zero-point adjustment must be made regularly, since contamination and ambient influences lead to a drift of the zero point. High-quality aerosol photometers are provided with means so as to be able to perform this zero-point adjustment automatically. To this end, the aerosol is firstly guided through a filter or over a separator, so that there are no longer any detectable particles in the measurement volume. The "correction value" then recorded is stored and subtracted from the photometer measured values in the subsequent aerosol measurements. The difference is then output as the photometer measured value.

When it comes to taking ambient measurements in cities, aerosol photometers are suitable measurement apparatuses.

In heavily loaded cities, partial particle mass concentrations of more than 0.4 mg/m$^3$ are sometimes measured.

Another class of optical particle sensors is constituted by optical particle counters (OPCs). These measurement apparatuses also use the effect of light scattering in aerosols. However, in contrast to aerosol photometers, it is not a particle collective that is measured, but instead individual particles. To this end, the optical and electrical requirements are much higher than in the case of aerosol photometers. In the case of an aerosol photometer, the light scattered by thousands of particles is detected. Since, in the case of an optical particle counter, only the light scattered by an individual particle is detected, a much higher sensitivity and/or light intensity is necessary.

The optical measurement volume, which in aerosol photometers can easily be several 100 to 1000 mm$^3$, has to be made much smaller in the case of optical particle counters. If, for example, 1000 particles per cm$^3$ are to be measured error-free with an optical particle counter, the optical measurement volume must be only approximately 0.5 mm$^3$ in size. It is thus ensured that only one particle is ever located in the optical measurement volume, up to a particle concentration of 1000 particles per cm$^3$. There are approximately 1000 particles per cm$^3$ for example in Shanghai with a PM2.5 air load of 120 μg/m$^3$.

At higher particle concentrations, what are known as coincidence errors occur.

There are then a number of particles simultaneously in the optical measurement volume. These particles are then detected as an individual particle and are classified in an incorrect size class. This produces errors in the measurement result.

These coincidence errors mean that, in the above-mentioned case, this optical particle counter can no longer be used already from a relatively low load of 120 μg/m$^3$.

Optical particle counters, however, do have some technical advantages with regard to their usable concentration range compared to aerosol photometers.

Optical particle counters do not have a zero-point drift, since a signal shape is assessed rather than a signal value.

Besides the number of particles, the particle size distribution (PSD) can also be detected on the basis of the signal shapes.

Optical particle counters calculate the particle mass concentration in an aerosol by dividing the detected particle sizes into size classes (bins) and measuring the frequency of occurrence for each size class or for each bin. Each size class or each bin is assigned a specific weighting factor, which, multiplied by the frequency of occurrence, gives the particle mass for this size class or for this bin.

If the particle masses of all relevant size classes or bins are added together, this gives the total mass concentration. In order to calculate PM2.5, the particle masses of all size classes or bins up to a particle size of 2.5 μm diameter are added together.

In order to calculate PM10, the particle masses of all size classes or bins up to a particle size of 10 μm are added together.

Optical particle counters respond in a much more robust manner to changes to the particle size distribution in the aerosol. If the particle size distribution in the aerosol changes towards large particles, the mass is underestimated with aerosol photometers, since the mass of a particle grows with the square of the surface area. The scattered light, however, is linear to the surface.

The service life and insensitivity to contamination of an optical particle sensor of a particle-measuring apparatus are key properties for reliable and low-maintenance operation of a particle-measuring apparatus of this kind.

Particle-measuring apparatuses of this kind, which have an optical particle sensor and by means of which the particle mass concentration in an aerosol volume can be detected, generally have a conveying device by means of which the aerosol to be analyzed can be conveyed through a measurement chamber of the particle-measuring apparatus associated with the optical particle sensor.

Pumps or fans are usually used as suitable conveying device.

Pumps have the advantage that a relatively accurately defined volume is conveyed per stroke. In the case of fans, the conveyed volume is dependent to a very much greater extent on external influences, for example local pressure differences or different flow resistances or line lengths between a measurement apparatus and the sample point.

Pumps, however, often have the disadvantage (compared to fans) of a shorter service life on account of the necessary seals and valves. In addition, the pulsating noise accompanying the pump operation is more bothersome, and cannot be effectively damped, compared to the noise accompanying the operation of a fan.

For particle-measuring apparatuses of this kind used in the automotive field, operating times of at least 6000 hours are required. Maintenance or replacement of the particle-measuring apparatus or of component parts thereof is neither desirable nor possible within this period of time. With a long operating time, the likelihood of contamination in particular of the optical particle sensor of the particle-measuring apparatus as a result of aerosol deposits is very high.

The contamination of the optical components, in particular of the optical particle sensor, on account of aerosol deposits of this kind leads to significantly reduced electrical signals of the particle-measuring apparatus with a predefined aerosol. Of course, the calibration factors are also no longer relevant or are no longer suitable. Since the electrical signals obtained in the particle-measuring apparatus with a predefined particle become smaller on account of the contamination, this particle is automatically classified into a smaller particle class. As a result, the particle-measuring apparatus outputs load values that are too low.

In addition, contamination or dust deposits in particular on fan blades always lead to imbalances and to reduced conveying capacity of the fans. The imbalances are accompanied by noise, which is bothersome, and a premature wear of the bearings of the fans.

In the particle-measuring apparatuses known from the prior art a conveying device thereof conveys, for example, an air volume of 2 l per minute through the measurement chamber of the particle-measuring apparatus. With a required operating time of the particle-measuring apparatus of 6000 hours, this gives a total conveyed volume of approximately 720 $m^3$. In Chinese cities the annual mean particle mass concentration is for example 0.2 $mg/m^3$ in some instances. For a particle-measuring apparatus, this means that in 6000 hours of operating time approximately 144 mg of dust particles are conveyed through the measurement chamber of the particle-measuring apparatus.

Proceeding from the above-discussed prior art, the object of the invention is therefore to create a particle-measuring apparatus and a method for operating a particle-measuring apparatus of this kind, with which device and method it is possible to significantly reduce the dust load of the particle-measuring apparatus, in particular the dust load of the optical particle sensor thereof, over the operating time, for example 6000 hours.

This object is achieved for a particle-measuring apparatus comprising an optical particle sensor, by means of which a particle mass concentration in an aerosol volume can be detected, a measurement chamber, in which the aerosol volume to be examined with regard to the particle mass concentration by means of the optical particle sensor can be received, and a conveying device, by means of which the aerosol can be introduced into the measurement chamber, in that the delivery rate of the conveying device of the particle-measuring apparatus is adjustable. Accordingly, in the case of the method for operating the particle-measuring apparatus, the solution is provided in that a delivery rate of the conveying device is adjusted.

On account of the adjustability of the conveying device of the particle-measuring apparatus provided in accordance with the invention, it is made possible to adapt the conveyed volume that flows through the measurement chamber of the particle-measuring apparatus, and more specifically, with high particle mass concentrations, the conveyed volume flowing through the measurement chamber can be reduced without in any way adversely affecting the validity of the load values output by means of the particle-measuring apparatus. On the other hand, due to the possible significant reduction of the conveyed volume flowing through the measurement chamber of the particle-measuring apparatus that is possible depending on the particle mass concentration, it is ensured that the mass of dust particles that is conveyed through the measurement chamber is significantly reduced, whereby, of course, dust deposits on the optical components, in particular on the optical particle sensor, are reduced similarly.

If the conveying device of the particle-measuring apparatus can be operated at a predefinable nominal delivery rate when the particle-measuring apparatus is started up, a change to the delivery rate, which is made in order to reduce dust deposits etc. in particular on the optical particle sensor, can be taken into consideration with little effort when calculating the output value of the particle-measuring apparatus.

The delivery rate of the conveying device is expediently adjustable, preferably in a software-controlled manner, depending on the particle mass concentration detected by means of the optical particle sensor. With this approach the contamination of the optical component parts of the particle-measuring apparatus by aerosol deposits can be minimized, wherein valid output values of the particle-measuring apparatus are nonetheless possible.

The delivery rate of the conveying device is advantageously reduced in accordance with a rising particle mass concentration and increased in accordance with a decreasing particle mass concentration.

In order to ensure that valid output values of the particle-measuring apparatus can be made available even at extraordinarily high particle mass concentrations, it is advantageous if a minimum delivery rate of the conveying device can be predefined with rising particle mass concentration. In a structurally less complex manner, a reliable adjustment of the delivery rate to the provided particle mass concentration can be made when the delivery rate of the conveying device can be varied by means of an adjustable operating voltage source, into the control unit of which the measurement signal of the optical particle sensor can be input. A method or an operating principle of the particle-measuring apparatus that is dependent on the particular particle mass concentration in the aerosol can thus be achieved in a simple way.

The invention will be explained in greater detail on the basis of embodiments with reference to the drawings, in which.

Figure 1:
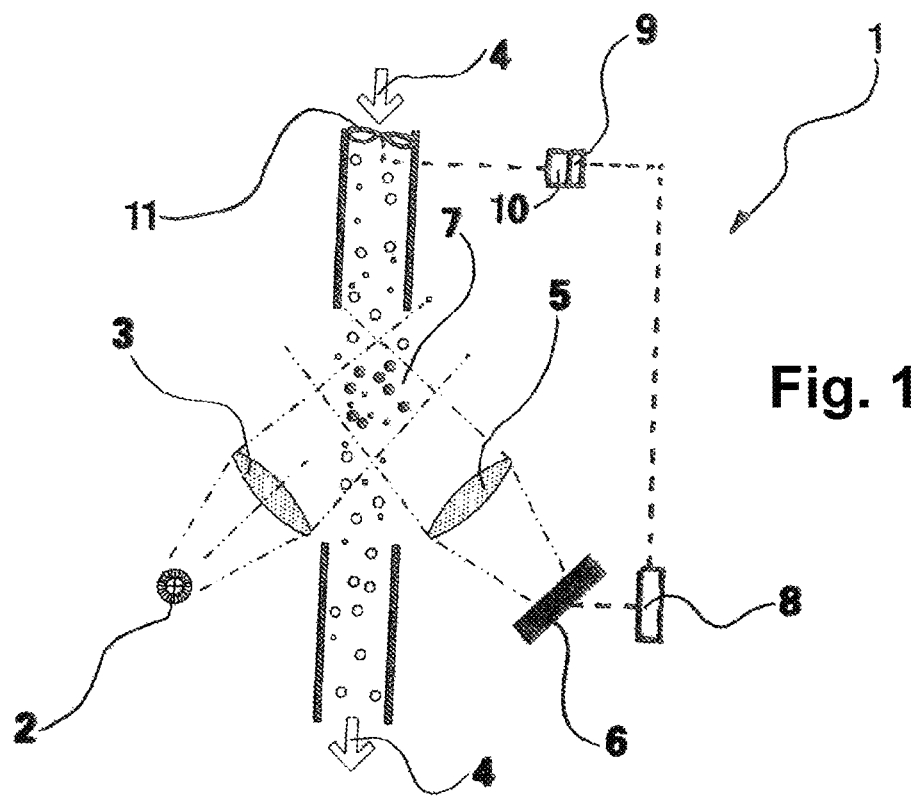
FIG. 1 shows a basic depiction of a first embodiment of a particle-measuring apparatus according to the invention for determining the particle mass concentration in aerosols.

An embodiment of particle-measuring apparatus 1 according to the invention, shown in a basic depiction in FIG. 1, is formed as an aerosol photometer (APM) 1. The aerosol photometer 1 is used to determine the particle mass concentration in an aerosol.

The aerosol photometer 1 has a monochromatic light source 2, which can be configured as a laser diode or as a light-emitting diode (LED). The light radiation emitted by the monochromatic light source 2 of the aerosol photometer 1 is bundled in an optical lens 3. The light beam leaving the optical lens 3 passes through a gas flow 4, which entrains the aerosol to be measured. Light is reflected in the direction of a further optical lens 5 or a reflector 6 arranged thereafter by particles of the aerosol contained in the gas flow 4. By means of the two optical lenses 3, 5, the measurement volume 7 or the corresponding measurement chamber 7 depicted in principle in FIG. 1 is provided. The light radiation directed in the measurement volume or in the measurement chamber 7 in the direction of the reflector 6 on account of the particles of the aerosol provided there and bundled by means of the optical lens 5 is detected at the reflector 6, wherein a photometer measured value corresponding to the detected light radiation is forwarded to an evaluation unit 8 of the particle-measuring apparatus or the aerosol photometer 1.

The photometer measured value forwarded from the reflector 6 of the aerosol photometer 1 to the evaluation unit 8 corresponds to the particle load provided or detected in the measurement volume or in the measurement chamber 7.

In the case of the aerosol photometer (APM) 1 of the embodiment shown on the basis of FIG. 1, a great advantage lies in the fact that the measured value detected in the evaluation unit 8 is independent of the flow rate of the gas flow 4 guiding the aerosol to be measured. In the case of the aerosol photometer (APM) 1, the measurement volume is defined by the optical measurement volume.

A control unit 9 for an operating voltage source 10 of a conveying device 11 is connected to the evaluation unit 8 of the aerosol photometer 1 shown in FIG. 1, by means of which control unit the flow rate and thus the volume flow of the gas flow 4 flowing through the aerosol photometer 1 can be adjusted.

Depending on the particle mass concentration present in the gas flow 4, which concentration is forwarded from the evaluation unit 8 of the aerosol photometer 1 to the control unit 9 of the operating voltage source 10 of the conveying device 11, the operating voltage source 10 and thus the conveying device 11 are operated by means of the control unit 9. At a high particle mass concentration, the conveying device 11 is shut down, so that the speed of the gas flow 4 is reduced. At a low particle mass concentration, the conveying device 11 is started up, so that the flow rate of the gas flow 4 is increased.

The load of the optical component parts of the aerosol photometer 1 with dust particles can thus be minimized without adversely affecting the validity of the output values for the particle mass concentration output by the evaluation unit 8.

Figure 3:
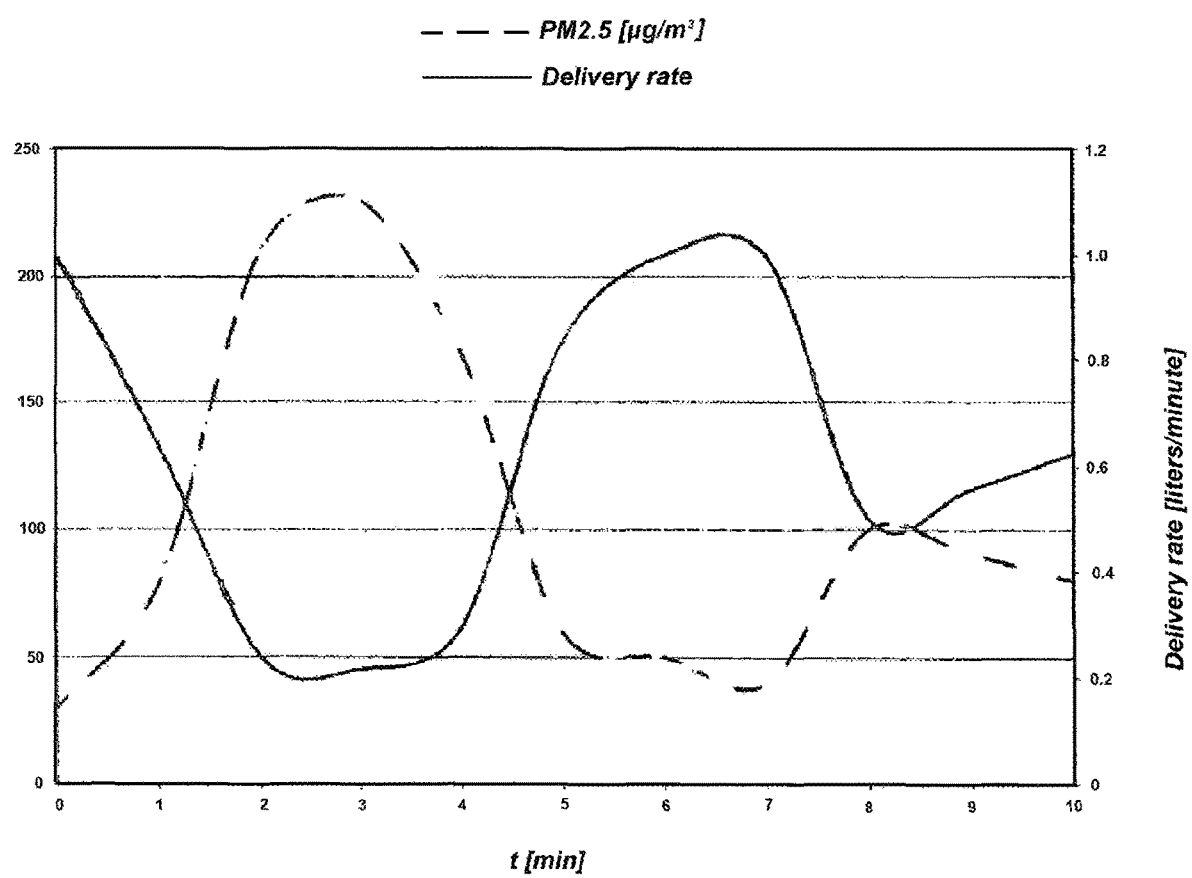
FIG. 3 shows a graph depicting the adjustment of a delivery rate of a conveying device of the particle-measuring apparatus according to the invention depending on a changing particle mass concentration.

As can be seen most clearly from FIG. 3, the speed of the gas flow 4 adjustable by means of the conveying device 11 and thus the delivery rate is reduced when the particle mass concentration rises, whereas the delivery rate is increased when the particle mass concentration drops.

Figure 2:
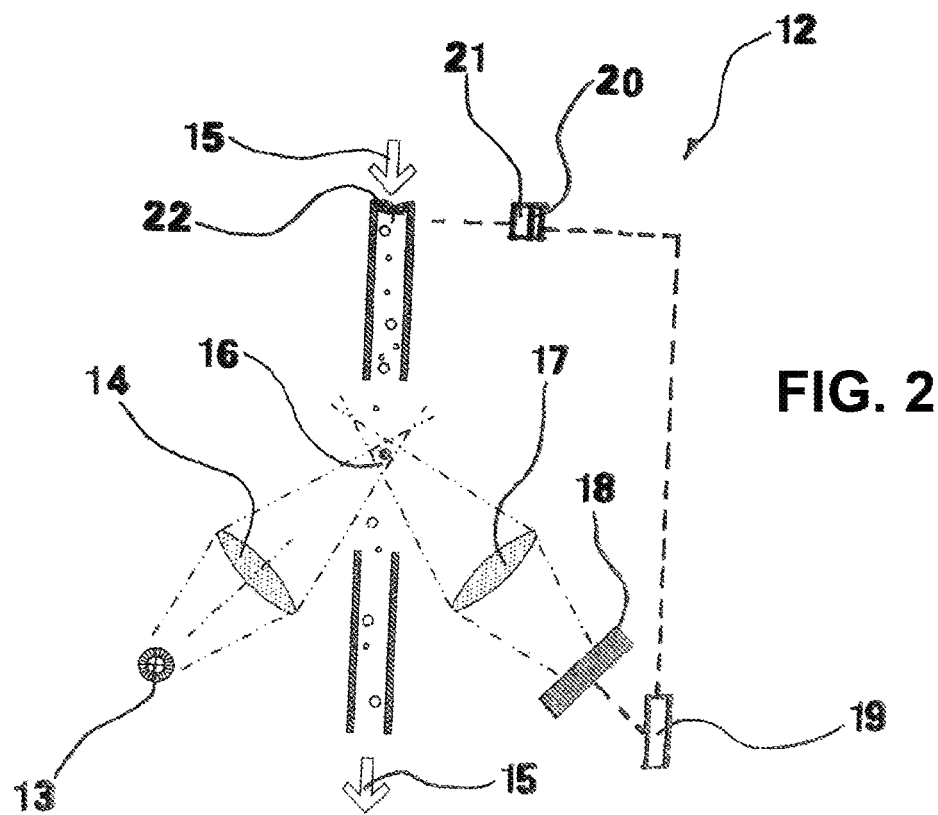
FIG. 2 shows a basic depiction of a second embodiment of the particle-measuring apparatus according to the invention.

An embodiment of the particle-measuring apparatus according to the invention depicted in FIG. 2 is configured as an optical particle counter 12. An optical particle counter 12 (OPC) of this kind is an optical measuring device, by means of which the individual particles in an aerosol can be counted and classified into a size class (BIN). Due to the optical measurement volume and the required coincidence, optical particle counters 12 can be used only with gas flows that have relatively low particle concentrations.

If relatively high particle number concentrations are measured, aerosol photometers 1 that are also referred to as nephelometers and that were explained above on the basis of FIG. 1 are therefore used.

The optical particle counters 12, as depicted in FIG. 2, can be converted, however, by the integration of the actual measurement signal, such that they behave in a manner corresponding more or less to an aerosol photometer 1.

In the case of the optical particle counter 12 shown in FIG. 1 the measurement volume is determined by the delivery rate flowing through the optical particle counter 12 and by the measurement time. The optical particle counter 12 shown in FIG. 2 likewise has a monochromatic light source 13, which can be formed as a laser diode or light-emitting diode (LED). The monochromatic light source 13 emits light radiation, which is bundled in an optical lens 14. The light beam bundled in the optical lens 14 crosses a gas flow 15, which carries the aerosol to be measured. The measurement volume or the corresponding measurement chamber 16 of the optical particle counter 12 depicted merely in principle in FIG. 2 is significantly smaller than the measurement volume 7 or the corresponding measurement chamber 7 of the aerosol photometer 1 described on the basis of FIG. 1.

This is achieved in the exemplary embodiment, shown in FIG. 2, of the optical particle counter 12 in that the light emitted by the monochromatic light source 13 is focused much more heavily by means of the optical lens 14 than by the optical lens 3 the aerosol photometer 1.

The measurement volume or the measurement chamber 16 of the optical particle counter 12 is dimensioned under consideration of the expectable values of aerosols to be measured, such that merely a single particle of the aerosol is provided therein. The light radiation reflected by the optical particle counter 12 in the measurement volume or in the measurement chamber 16 of the optical particle counter 12 is directed by an optical lens 17 to a reflector 18 of the optical particle counter 12 disposed after the optical lens 17 in the beam path. For each individual particle of the aerosol flowing through the measurement volume or the measurement chamber 16 of the optical particle counter 12 together with the gas flow 15, an individual measured value corresponding to the individual particle is thus forwarded at the reflector 18 of the optical particle counter 12 to an evaluation unit 19 of the optical particle sensor 12. Each individual measured value corresponds to the light reflected by a single particle of the aerosol to be measured and directed by the optical lens 17 to the reflector 18 of the optical particle counter 12.

In the optical particle counter 12 as depicted in FIG. 2 and as has been described above, the optical measurement volume or the measurement chamber 16 for example has a volume of 0.02 cm×0.2 cm×0.2 cm=0.0008 cm³. Particle number concentrations up to approximately 1000 particles per cm³ can thus be counted without coincidence errors. With a delivery rate of 1.2 l per minute, a measurement volume of 20 cm³ per second is given. At most, 20 cm³× 1000 particles/cm³=20000 particles can thus be counted per second.

In the case of the optical particle counter 12, the peak values or peaks in the intensity signal output by the reflector 18 are detected, wherein the frequency of occurrence of these peak values is counted. The peak values or peaks are classified in the aforementioned size classes (bins) on the basis of their level. The frequency of occurrence per size class (bin) is multiplied by a calibration value predefined for the optical particle counter 12 so as to arrive at the particle mass for the particular size class (bin).

The particle masses of all size classes relevant for the measurement are then added together in order to obtain the particle mass concentration of the measured aerosol. For a particle mass concentration that is to be determined having a maximum particle diameter of 2.5 μm, referred to as PM2.5, for example all size classes up to a particle diameter of 2.5 μm are added. Accordingly, all size classes up to a particle diameter of 10 μm are added for PM10.

With a changing delivery rate, the frequency of occurrence per size class (bin) and thus the particle mass concentration calculated in the evaluation unit 19 also changes. In order to eliminate this effect, which adversely affects the validity of the output values to be output by means of the optical particle counter 12, the evaluation unit 19 of the optical particle counter 12 shown in FIG. 2 is designed with an integration member, by means of which the integral of the above-described peak values or peaks of the intensity signal is formed. Accordingly, the output value provided by the evaluation unit 19, as in the case of an aerosol photometer 1 described on the basis of FIG. 1, is no longer dependent on the delivery rate or the volume of the gas flow 15 flowing through the optical particle counter 12 per unit of time.

With the peak value or peak detection that is also possible, it is still possible to determine the particle size distribution of the aerosol, for example so as to be able to distinguish different aerosols from one another.

If the output value of the optical particle counter 12 output by the evaluation unit 19 is no longer dependent on the delivery rate of the gas flow 15 flowing through the optical particle counter 12 on account of the above-described integration member and the integration performed by means of said member, the optical particle counter 12 can also work with variable delivery rates.

Accordingly, the evaluation unit 19 of the optical particle counter 12 is connected to a control unit 20 of an operating voltage source 21 of a conveying device 22.

By means of the conveying device 22, which can be configured as a pump or as a fan, the delivery rate or the amount of the gas flow 15 flowing through the optical particle counter 12 is adjusted. To this end, the operating voltage source 21 is controlled by means of the control unit 20 in accordance with the output value of the evaluation unit 19, which output value is characteristic for the particle mass concentration of the aerosol to be measured.

At high particle mass concentrations the delivery rate or the conveyed volume of the gas flow 15 provided by means of the conveying device 22 is relatively low, and at low particle mass concentrations it is accordingly relatively high, as can be seen in particular from FIG. 3.

In the case of the particle-measuring apparatus 1, 12, as has been explained on the basis of FIG. 1 for an aerosol photometer 1 and on the basis of FIG. 2 for the optical particle counter 12, a nominal delivery rate is predefined. The particle-measuring apparatus 1, 12 starts its measurement operations with this predefined nominal delivery rate after being switched on.

The nominal delivery rate is a specific particle mass concentration range, for example a particle mass concentration range of from 0 to 10 μm/$m^3$.

This allocation is selected so that, with a low particle mass concentration, enough particles are detected to obtain a sufficiently resolved signal.

If the particle mass concentration of the aerosol to be measured is greater, the delivery rate can be reduced accordingly, without hereby reducing the number of detected particles.

The number of detected particles determines the signal resolution. The more particles that are detected and evaluated within a measurement interval, the better is the signal resolution.

In town traffic situations, loads up to <2000 μg/$m^3$ are possible. These represent a significant dust load for the particle-measuring apparatus 1, 12.

In these areas with high particle loads, the delivery rate that is provided in the particle-measuring apparatus 1, 12 by means of the conveying device 11, 22 is reduced in accordance with the measured particle mass concentration and is lowered as far as a predefinable threshold value.

Even at very high particle mass concentrations, the delivery rate is not reduced to zero, since without a gas flow particles could be deposited particularly heavily on the surfaces of optical component parts of the particle-measuring apparatus 1. 12.

The invention claimed is:

1. A particle-measuring apparatus comprising:

an optical particle sensor that can detect a particle mass concentration in an aerosol volume, a measurement chamber holding the aerosol volume being examined with regard to the particle mass concentration by the optical particle sensor, a conveying device that can introduce the aerosol into the measurement chamber at an adjustable delivery rate, and a control unit connected to the conveying device for varying the delivery rate depending on the particle mass concentration detected by the optical particle sensor by reducing the delivery rate when the detected particle mass concentration rises and increasing the delivery rate when the detected particle mass concentration decreases.

2. The particle-measuring apparatus according to claim 1, wherein the control unit operates the conveying device with a predetermined nominal delivery rate only when the particle-measuring apparatus is initially started up.

3. The particle-measuring apparatus according to claim 1, wherein a minimum delivery rate of the conveying device can be predefined with rising particle mass concentration.

4. The particle-measuring apparatus according to claim 1, wherein the control unit varies the delivery rate of the conveying device by varying an operating voltage thereof according to the measurement signal of the optical particle sensor.

5. A method of operating a particle-measuring apparatus, the method comprising the steps of:

detecting with an optical particle sensor a particle mass concentration in an aerosol volume;

introducing with a conveying device aerosol into a measurement chamber, at an adjustable delivery rate; and varying the delivery rate depending on the particle mass concentration detected by the optical particle sensor by reducing the delivery rate when the detected particle mass concentration rises and increasing the delivery rate when the detected particle mass concentration decreases.

6. The method according to claim 5, further comprising the step of:

operating the conveying device with a predetermined nominal delivery rate only when the particle-measuring apparatus is initially started up.

7. The method according to claim 5, wherein a minimum delivery rate of the conveying device is predefined with rising particle mass concentration.

8. The method according to claim 5, wherein the delivery rate of the conveying device is varied via an adjustable operating voltage of the conveying device depending on the particle mass concentration.

9. The particle-measuring apparatus according to claim 1, wherein the optical particle counter has an evaluation unit comprising an integrator forming an integral of peak values of the intensity signal as part of the measurement signal.

* * * * *